Fig. 2

Dec. 11, 1956    H. CRÄMER ET AL    2,773,335
CENTERING ARRANGEMENT FOR MACHINE TOOLS
Filed Jan. 26, 1954    6 Sheets-Sheet 4

Fig. 5

United States Patent Office 2,773,335
Patented Dec. 11, 1956

2,773,335

CENTERING ARRANGEMENT FOR MACHINE TOOLS

Helmut Crämer, Stuttgart-Degerloch, and Robert Meyer, Stuttgart-Rohr, Germany, assignors to Firma Fortuna-Werke Spezialmaschinenfabrik A.-G., Stuttgart-Bad Cannstatt, Germany Application January 26, 1954, Serial No. 406,235

Claims priority, application Germany January 28, 1953

17 Claims. (Cl. 51—165)

The present invention refers to a centering arrangement for machine tools, and more particularly to center means which are mounted in the headstock of a grinding machine movable in axial direction.

Workpieces have frequently to be ground at a point thereof which has a predetermined distance from the end face of the workpiece. Mass-produced series of workpieces often show considerable differences, not only in their length, but also in the depth and width of their centering holes. Due to such changes in the dimensions it is impossible to assume a predetermined position of the center means as reference point for desired measurements.

According to known centering arrangements for grinding machines, the headstock and tailstock centers are resiliently supported, and the spring urging the tailstock center toward the headstock center is made somewhat stronger so that the workpiece is pressed against an abutment means secured to the headstock. The abutment means defines the axial position of the workpiece, while the headstock center only serves for centering the workpiece. Since the position of the abutment means is fixed, the tool engages the workpiece at a distance from its end which corresponds to the distance of the tool from the fixed abutment means.

However, the known arrangements have a considerable disadvantage. Since the abutment means engages the workpiece at a point spaced from the axis of the same, eccentric forces act on the workpiece which cause tension in the workpiece and deformation of the same which are particularly noticeable and detrimental when slender workpieces are ground or otherwise machined.

In order to reduce such undesired tension, and also in order to reduce the frictional forces of the non-rotating abutment means on the workpiece, it has been proposed to reduce the resilient pressure of the centers which again resulted in inadequate guidance of the workpiece.

It is the object of the present invention to overcome the disadvantages of the known constructions and to provide means for holding a workpiece immovable in axial direction while being supported between centers.

It is another object of the present invention to provide means for shifting a workpiece for a predetermined distance from a control position engaging positioning means into an operating position in which no eccentric pressure of the positioning means act on the workpiece.

It is still another object to clamp the resiliently supported axially movable center means of the headstock of a machine tool in a predetermined operating position.

With these objects in view the present invention mainly consists in a centering arrangement for rotary machine tools. Center means are mounted movable in axial direction in supporting means, such as a headstock, and are urged by resilient means in one axial direction toward a workpiece into an extreme projecting position. Positioning means define a predetermined position of the workpiece in which the center means is located in a position retracted from the extreme projecting position. Holding means block movement of the center means in the opposite axial direction for holding said center means in an operating position. In the event that the workpiece is automatically moved into the predetermined position, the center means are blocked in the position into which they were moved by the workpiece. In the event, however, that the positioning means are abutment means engaging an end face on the workpiece, either the abutment means is shifted away from the workpiece, or the workpiece is shifted away from the abutment means so that during the normal operation of the machine tool the workpiece is supported only between the centers of the headstock and tailstock, and spaced from the abutment means. Before the operations start, the center means is clamped to the supporting means.

According to a preferred embodiment of the present invention, a clamping ring is mounted on the center means within the hollow headstock spindle, and the means are provided for clamping the clamping ring against the hollow spindle. The center means are preferably arranged shiftable with respect to the clamping ring, it is however, also possible to clamp the center means to the hollow spindle and to shift the abutment means against which the workpiece abuts.

Means must be provided to shift the center means or the abutment means for a constant distance, preferably 2 mm.

The arrangement according to the present invention is preferably so constructed that the apparatus is effective not only with dead centers, but also with a live headstock center which rotates with the headstock spindle. It is also preferred that the apparatus is operated by a single manual operation. Finally, the construction should be such that no radial forces act on the center means.

In a modified arrangement of the present invention, which is particularly suitable for automatic operation, instead of fixed abutment means, positioning means are provided which include sensing means for sensing the position of the work piece by mechanical feeler means, by light beams, or similar devices. Such sensing means cooperate with means for moving the workpiece which either engage the work piece directly, or advance the center means of the tailstock. When the predetermined desired position of the work piece between the center means of headstock and tailstock is obtained, an impulse is transmitted from the sensing means to the positioning means so that movement of the workpiece is stopped and the headstock center is clamped to the headstock, as described above. In this embodiment the center means need not be shifted. In the event that a mechanical feeler means is used, the feeler is retracted from the work piece during operation so that there is not even the slightest eccentric force on the work piece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
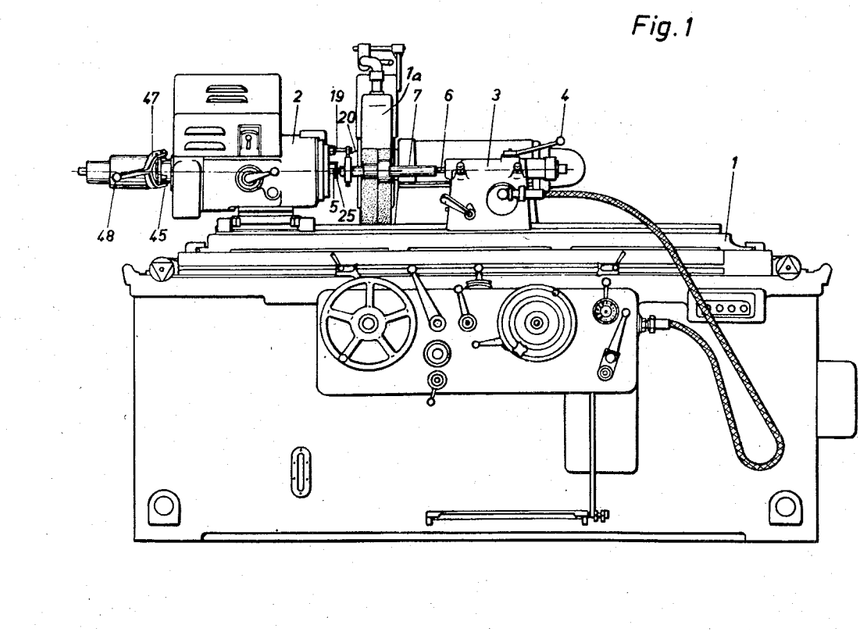
Fig. 1 is a front elevation of a grinding machine provided with the arrangement according to the present invention.

In the drawings, and more particularly in Fig. 1, a headstock 2 and a tailstock 3 are shown to be mounted on the supporting structure 1 of a grinding machine which includes a grinding tool means 1a. Center means are provided in the headstock and in the tailstock and are resiliently urged toward the work piece 7. The center means of the tailstock may be advanced by the manually operated lever 4, or by a fluid servo motor. Between the points 5 and 6 of the centers the work piece 7 is arranged which is provided with center holes into which the points 5 and 6 project.

Figure 6:
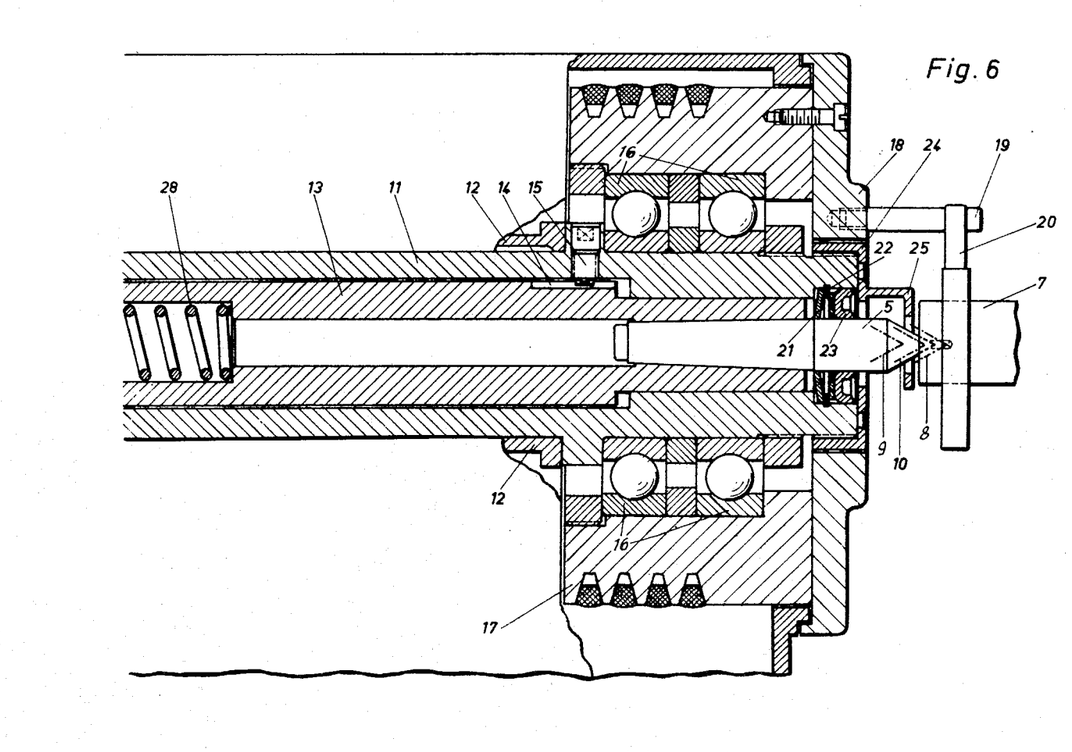
Fig. 6 is a horizontal sectional view through the forward end portion of a centering arrangement according to the present invention illustrating the possible positions of the points of the center means.

In Fig. 6 several positions of the center 5 are shown. The center 5 is mounted in a movable center member 13 which is urged in one axial direction toward the work piece 7 by the resilient means 28. The center 5 assumes the extreme projecting position 8 when no pressure is exerted by the work piece 7 and by the tailstock center. The normal operating position is shown in solid lines. When center 5 is pressed farther to the left in the opposite axial direction into the position 10, the work piece abuts against the abutment means 25. Without provision of abutment means, the center could be pressed into the position 9.

The hollow spindle 11 is turnably mounted in bearings 12 of the headstock 2, and can be fixed in the headstock. The center means 13, 5 is mounted within the hollow spindle 11 movable in axial direction, and is urged by the spring 28 in one axial direction toward work piece, and toward the extreme projecting position 8, respectively. A relative turning of the members 11 and 13 is prevented by a screw 15 which projects into a slot 14 formed in member 13. At the forward end of the hollow work spindle 11, a pulley 17 is rotatably mounted on the work spindle 11 by means of ball bearings 16 and carries a driving disk 18. The driving dog 20 is clamped to the work piece 7 and connected to the driving disk 18 by pin 19. A cup-shaped spring 21 is mounted at the forward end of the center member 13 and fixed to the hollow spindle 11 by means of split ring 22. When the forward end of the member 13 engages the spring 21, the point of the center assumes the position 8. A packing ring 23 closes the recess in which the spring 21 is arranged, and prevents entering of dust or lubricating liquid.

The abutment means 25 is threadedly connected to the hollow spindle 11. The pulley 17 can be connected to the hollow spindle 11 by means which are not shown in the drawing, so that the hollow spindle 11, the center means 5, 13, and the abutment means 25 rotate with the pulley.

Figure 2:
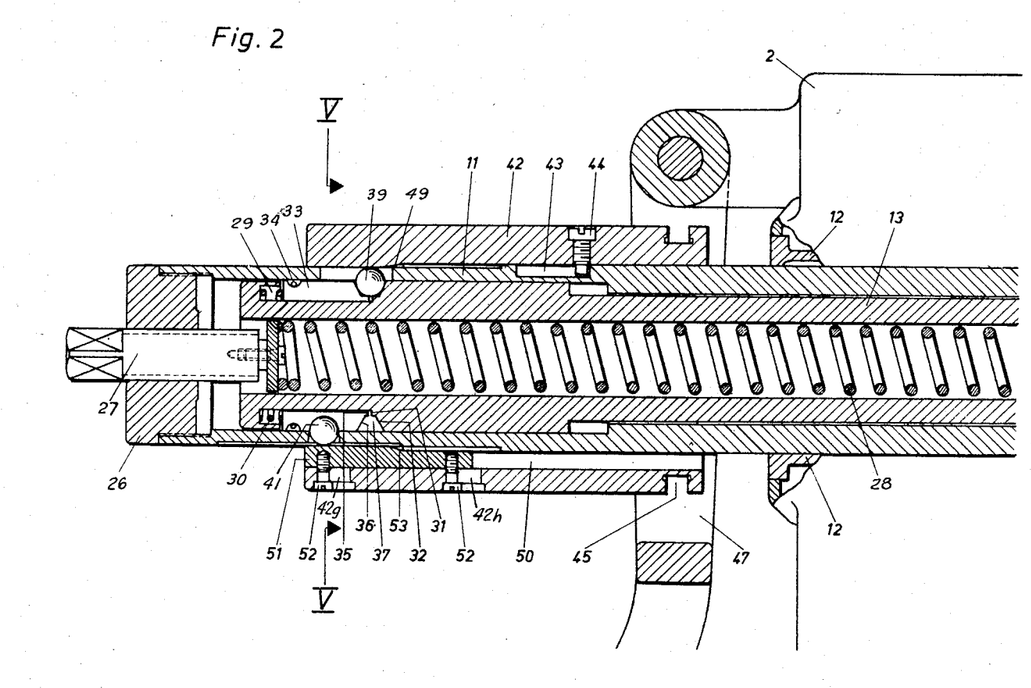
Fig. 2 is a horizontal sectional view through the rear end portion of the centering arrangement of the present invention showing the center means in operating position.
Figure 3:
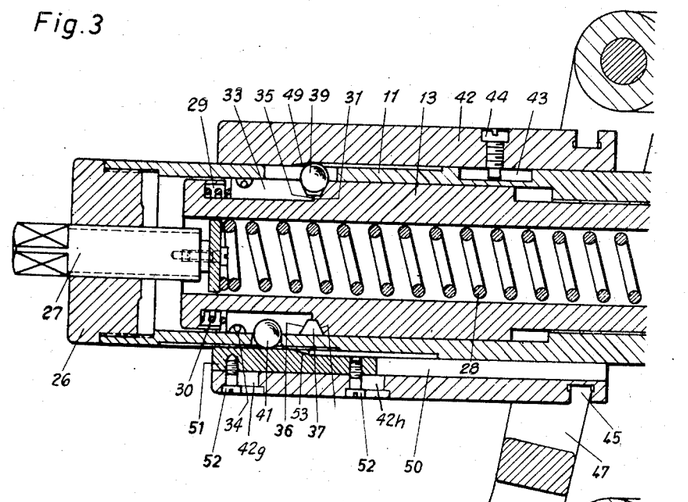
Fig. 3 is a horizontal sectional view similar to Fig. 2 showing an intermediate position of the arrangement.
Figure 4:
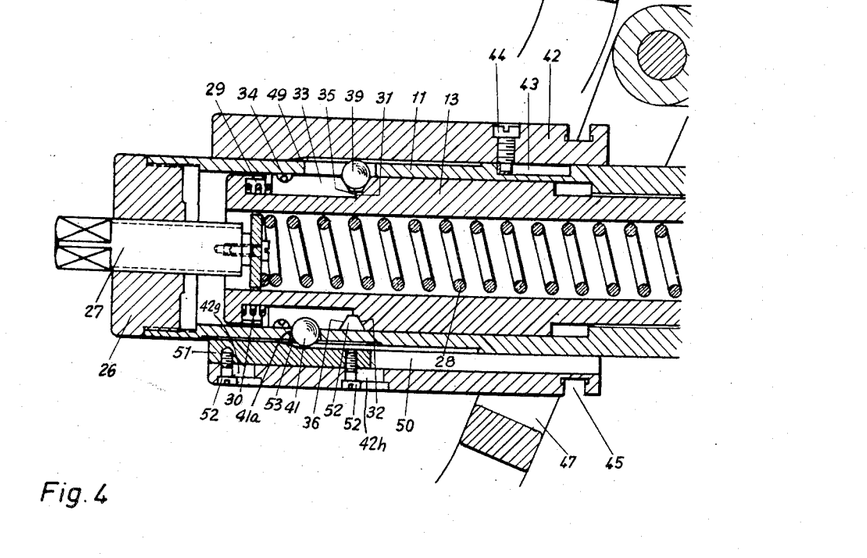
Fig. 4 is a horizontal sectional view similar to Fig. 2 showing a position of the arrangement in which the center means are resiliently removable.

Figs. 2, 3 and 4 illustrate the arrangement of the present invention by which the center means 5, 13 is shifted. The hollow spindle 11 carries an end member 26 which is provided with an adjusting screw 27 for adjusting the tension of the spring 28 by which the center means 5, 13 are urged toward the work piece.

Figure 5:
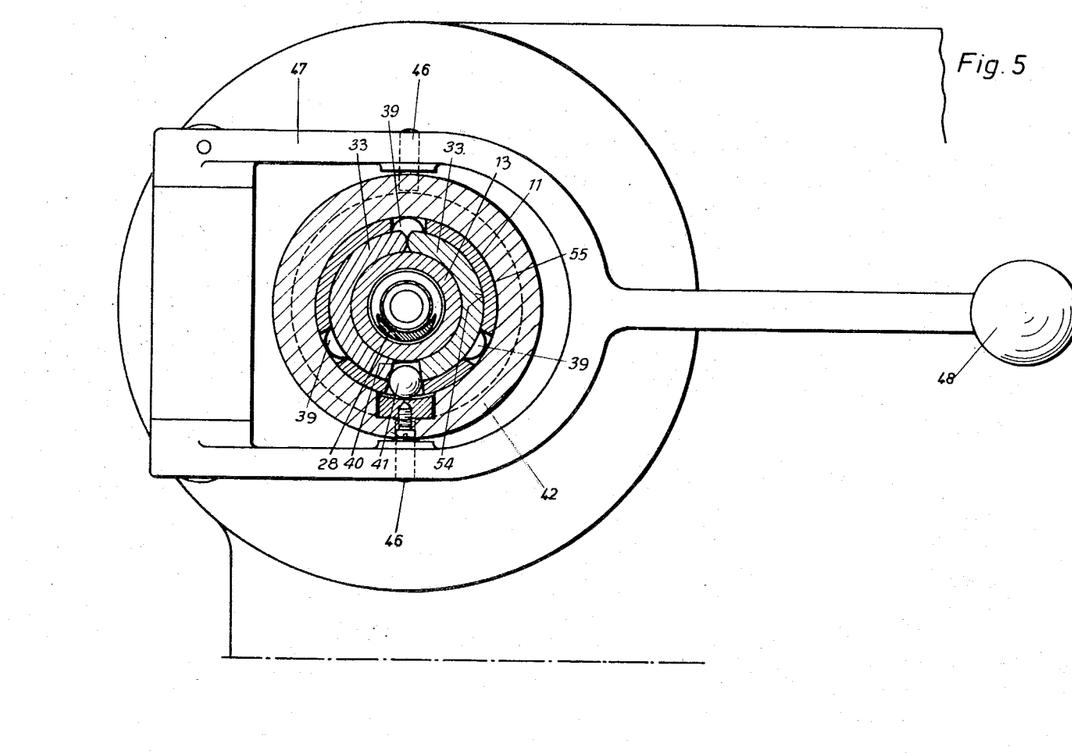
Fig. 5 is a cross-sectional view taken on line V—V in Fig. 2.

The member 13 is provided with an annular recess 29 which has at the rear end thereof a partly closed portion in which a spring 30 is mounted. The forward end portion of the recess 29 is bounded by an annular conical face 32, and by an annular face 31, the faces 31 and 32 being connected by a cylindrical face portion. A clamping ring 33, which is preferably composed of two parts, see Fig. 5, is mounted in the recess 29. The clamping ring has a slot 40 of trapezoid cross-section which widens outwardly in radial direction and houses at least one ball member 41 which is arranged in a bore 41a of the member 11, see also Fig. 5.

An annular spring 34 compresses the two halves of the clamping ring 33 so that the ball member 41 tends to move into the position shown in Fig. 4 in which a ball portion projects beyond the outer surface of the member 11.

The forward end of the clamping ring 33 is provided with a conical face 36 located opposite the conical face 32 and forming together with the same an annular groove 37 of trapezoid cross-section in which ball means 39 are arranged. The spring 30 urges the clamping ring into the position shown in Figs. 3 and 4.

An operating sleeve 42 is mounted on the hollow work spindle 11 slidable in axial direction between two extreme positions, which are defined by a stop screw 44 cooperating with the recess 43 in the hollow spindle 11. The operating sleeve 42 is shifted in axial direction by a manually operated forked lever 47 which is pivotally mounted on the headstock supporting means. Two pins 46 are secured to the forked end of the lever 47 and project into an annular groove 45 provided in the outer surface of the operating sleeve 42. The operating lever 47 is manually operated by the handle 48 for shifting the sleeve 42.

The rear end portion of the work spindle 11 has a slightly reduced diameter, and the inner surface of the operating sleeve 42 is correspondingly composed of two cylindrical surfaces which are connected by a conical shoulder portion 49. The operating sleeve 42 has a slot 50 in which a member 51 is mounted by means of screws 52. Member 51 has an inclined shoulder portion 53 and may be made adjustable in axial direction by mounting screws 52 in axial slots 42g and 42h in sleeve 42, as shown in Figs. 2, 3 and 4.

In the inoperative position of the center means shown in Fig. 4, the ball member 41 engages the cylinder surface portion of greater diameter of the member 51, and the ball means 39 engage the cylinder surface portion of greater diameter of the operating sleeve 42. Consequently the balls 39 and 41 are in their outer positions. Ball 41 is in the wider outer portion of slot 40, see Fig. 5, so that the clamping sleeve 33 is not expanded and permits sliding of the center means 13, 5 in the hollow spindle 11. The annular faces 31, 35 abut against each other, since the balls 39 are in their outer positions.

In this position a work piece 7 is pressed against the center 5, and the center means 5, 13 are moved to the left in Fig. 6 until the center point is in the position 10, and the work piece 7 engages the abutment means 25. Such positioning of the work piece is obtained by advancing of the center means 6 of the tailstock.

The handle 48 is now manually operated so that the shifting lever 47 shifts the operating sleeve in one axial direction to the right in Fig. 4 until the surface portion of smaller diameter of the member 51 engages the ball 41. When the shoulder 53 passes over the ball 41, the ball 41 is pressed into the slot 40, and since this slot narrows inwardly, see Fig. 5, the clamping ring halves are pressed apart so that the clamping ring 33 is expanded and clamped against the hollow spindle 11, with the surfaces 54 and 55 in clamping engagement.

Continued manual shifting of the operating means 47, 42 brings the shoulder 49 of the operating sleeve 42 into engagement with the ball members 39, as shown in Fig. 5, so that the same are inwardly pressed into the trapezoid groove formed by the conical walls 32 and 36. The center means 5, 13 are pressed away from the clamping ring 33 to the right in Fig. 3 for a distance which is exactly determined by the diameter of the balls 39 and by the shape of the walls 32 and 36. This position is shown in Fig. 2, and also in Fig. 6 which shows the work piece 7 supported on the center point 5 spaced the predetermined distance from the abutment means 25.

It will be apparent from the above description of a preferred embodiment of the present invention that by a single operation of the operating means 47, 42 the holding means 33 are actuated to block movement of the center means 13, 5 to the left in Fig. 3 and the shifting means 32, 36, 39 are actuated to shift the center means 5, 13 to the right in Fig. 3 into the position of Fig. 2 into an operating position in which the work piece is spaced from the abutment or positioning means 25. While the annular faces 31, 35 are in engagement, the center means 13, 5 are in the control position 10 in which the work piece 7 engages the abutment means 25.

When no work piece is arranged between the headstock and tailstock centers 5 and 6, the headstock center means 13, 5 assume the position 8. In the event that the operating means 47, 42 are operated in this position, an element might be damaged. Consequently the stop means for the center means 13, 5 are not rigid, but are resilient. In the illustrated embodiment the cup-shaped spring 21 serves as a stop, limiting movement of the center member 13 to the right. Spring 21 is harder than spring 28 and cannot be deformed by the pressure of spring 28. Moreover, spring 21 can be resiliently compressed a distance greater than the spacing between faces 31 and 35 in the position of Fig. 2, so that no part can be damaged.

Figure 7:
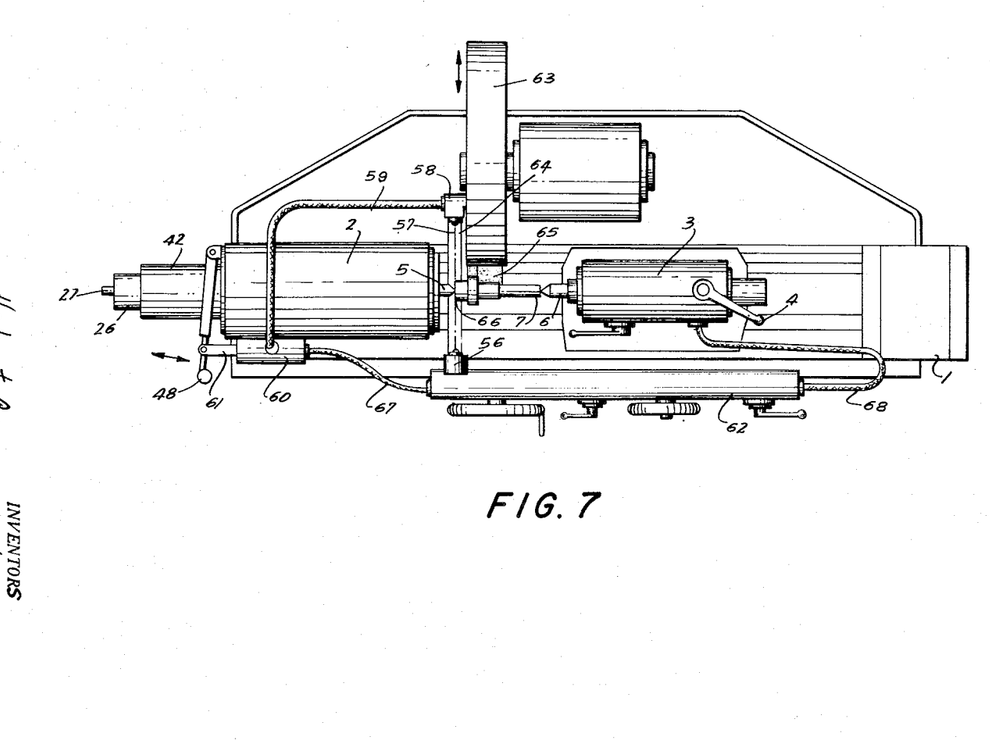
Fig. 7 is a plan view of a modified embodiment.

As described above, instead of the fixed abutment means 25, sensing means may be provided for positioning the work piece, and in this event it is not necessary to shift the center means but a clamping means is actuated to clamp the center means to the hollow work spindle 11. As shown in Fig. 7, the modified embodiment in which sensing means are providing instead of mechanical abutment means, comprises, corresponding to the previously described embodiment, center means 5 which are mounted for axial movement in the headstock 2, as shown in Fig. 2. An operating lever 48 is provided for actuating the clamping ring 33, which is shown in Fig. 7. The work piece 7 is shifted to the left in Fig. 7 until the center means 5 arrives in a control position which is determined by electric sensing means. The sensing means comprise a transmitter 56 which emits a beam of light 57, or an electron beam 57 which is received by a receiving station 58. It will be understood that an impulse is created at the receiving station 58, in a known manner, when the reference edge 66 of the work piece 7 blocks the beam 57. The thus created impulse effects actuating of the servo-motor 60 which is connected by a link 61 to the operating lever 48 so that the clamping ring 33, not shown in Fig. 7, is fixedly clamped to the supporting spindle means 11 and blocks further movement of the center means 5, 13 to the left in Fig. 7 whereby the position of the work piece is determined. In this modified embodiment shifting of the center means is unnecessary since there is no engagement between an abutment means and the work piece which may cause tension in the work piece and deformation of the same. In the above described modified embodiment, the elements described in the first embodiment for shifting the center means 5, 13 to the right away from the abutment means can be omitted.

In the machine illustrated in Fig. 7, an elongated member 64 is secured to the protective cover 63 of the grinding wheel 65, or to another part of the machine which moves together with the grinding wheel. Preferably member 64 is adjustably attached.

It is necessary to arrange the transmitter 56 and the receiver 58 on a common carrier, namely, the member 64, in order to keep the transmitter and the receiver properly aligned. The receiver 58 is connected by a cable 59 to the servo-motor 60 which is mounted on the headstock 2. The servo-motor is connected by cable 67 to an automatic control mechanism which is arranged in the casing 62 which is connected to tailstock 3 by cable 68. In accordance with such automatic control, the servo-motor 60 may be a magnetic relay or a hydraulic apparatus. The servo-motor is connected by a rod 61 to the handle 48. The work piece is automatically moved by the center means 6 from the right to the left in Fig. 7 when the automatic control is actuated. After the work piece has centered on the center means 5, its reference edge 66 reaches the beam 57, and the intensity of the impulse received by the receiver 58 is changed in such a manner that the receiver is actuated and sends an impulse through conductor 59 to the servo-motor 60. The servo-motor actuates by means of the connecting rod 61 the handle lever 48, and consequently the sleeve 42 is shifted, ball 41 is pressed into the groove 40 of the clamping ring 33, and the clamping ring is clamped to member 11. The center means is thereby arrested. Since the work piece 7 is not mechanically engaged by the beam 57, it is not necessary to advance the center means 9, and consequently the balls 39, the shoulder 49, and the nut 37 with the faces 32 and 36, may be omitted.

It will be understood that each of the elements described above, or two or more together, may also find a useful application in other types of machine tools differing from the types described above.

While the invention has been illustrated and described as embodied in a centering arrangement for a grinding machine having an axially movable resilient headstock center whose axial movement is blocked in a predetermined operating position of the center means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a centering arrangement for rotary machine tools, in combination, supporting means; center means having an extreme projecting point adapted to engage a center hole in a workpiece, said center means being mounted in said supporting means and being movable in axial direction; means urging said center means in one axial direction into an extreme projecting position adapted to project toward a workpiece; abutment means mounted on said supporting means located spaced in the opposite axial direction from said extreme projecting point of said center means in an axial direction opposite said one axial direction and adapted to engage in a predetermined position a workpiece engaging said center means whereby said center means is located in a control position moved from said extreme projecting position in the opposite axial direction; manually operable stop means movable between an inoperative position and a blocking position for blocking further movement of said center means in said opposite axial direction; and shifting means engaging said center means and said stop means for shifting said center means relative to said supporting means and said abutment means in said one axial direction for a predetermined distance so that said workpiece is spaced from said abutment means; and operating means for actuating said holding means and said shifting means.

2. In a centering arrangement for rotary machine tools, in combination, supporting means; center means adapted to engage a center hole in a workpiece and being mounted in said supporting means movable in axial direction; means urging said center means in one axial direction into an extreme projecting position adapted to project toward a workpiece; abutment means secured to said supporting means located spaced from the extreme projecting point of said center means in an axial direction opposite said one axial direction for positioning in a predetermined position a workpiece engaging said center means whereby said center means is located in a control position moved from said extreme projecting position in the opposite axial direction; clamping stop means mounted on said supporting means and being movable into a clamping position engaging and clamped to said supporting means for blocking movement of said center means in said opposite axial direction; and shifting means engaging said center means and said clamping stop means for shifting said center means relative to said supporting means and said abutment means in said one axial direction for a predetermined distance from said control position into an operating position.

3. In a centering arrangement for rotary machine tools, in combination, supporting means including a hollow spindle; center means adapted to engage a center hole in a workpiece and being mounted in said hollow spindle movable in axial direction; resilient means urging said center means in one axial direction into an extreme projecting position adapted to project toward a workpiece; abutment means secured to said supporting means for positioning in a predetermined position a workpiece engaging said center means whereby said center means is located in a control position moved from said extreme projecting position in the opposite axial direction; a radially expansible clamping ring surrounding said center means and being located within said hollow spindle, said clamping ring being movable into an expanded position engaging and clamped to said hollow spindle; and shifting means engaging said center means and said clamping ring for shifting said center means for a predetermined constant distance relative to said supporting means and said abutment means into an operating position for engaging the workpiece in a position spaced from said abutment means.

4. In a centering arrangement for rotary machine tools, in compination, supporting means including a hollow spindle; center means adapted to engage a center hole in a workpiece and being mounted in said hollow spindle movable in axial direction; resilient means urging said center means in one axial direction into an extreme projecting position adapted to project toward a workpiece; abutment means secured to said supporting means for positioning in a predetermined position a workpiece engaging said center means whereby said center means is located in a control position moved from said extreme projecting position in the opposite axial direction; a radially expansible clamping ring surrounding said center means and being located within said hollow spindle, said clamping ring being movable into an expanded position engaging and clamped to said hollow spindle; shifting means engaging said center means and said clamping ring for shifting said center means for a predetermined constant distance relative to said supporting means and said abutment means into an operating position for engaging the workpiece in a position spaced from said abutment means; and common operating means for said shifting means and for said clamping ring for consecutively expanding said clamping ring and shifting said shifting means in a single operation.

5. In a centering arrangement for rotary machine tools, in combination, supporting means including a hollow spindle; center means adapted to engage a center hole in a workpiece and being mounted in said hollow spindle movable in axial direction; resilient means urging said center means in one axial direction into an extreme projecting position adapted to project toward a workpiece; abutment means secured to said supporting means for positioning in a predetermined position a workpiece engaging said center means whereby said center means is located in a control position moved from said extreme projecting position in the opposite axial direction; a clamping ring surrounding said center means and being located within said hollow spindle, said clamping ring having an axial slot of trapezoidal cross-section widening in outward direction, said clamping ring being movable into an expanded position engaging and clamped to said hollow spindle; at least one ball member in said axial slot; an operating sleeve mounted on said hollow spindle movable in axial direction into an actuating position, said operating sleeve having an inner shoulder portion engaging said ball member during movement to said actuating position and urging the same inwardly into said slot in said clamping ring for moving said clamping ring into said expanded position; and means operated by said operating sleeve for shifting said center means in said one axial direction away from said clamping ring into an operating position for shifting the workpiece into a position spaced from said abutment means.

6. An arrangement as claimed in claim 5 wherein said operating sleeve is formed on its outer surface with an annular groove; and including a manually operated forked shifting lever pivotally mounted on said supporting means and having a forked end portion engaging said annular groove.

7. An arrangement as claimed in claim 5 and including servomotor means for shifting said operating sleeve.

8. In a centering arrangement for rotary machine tools, in combination, supporting means; center means adapted to engage a center hole in a workpiece and being mounted in said supporting means movable in axial direction; means urging said center means in one axial direction into an extreme projecting position adapted to project toward a workpiece; abutment means secured to said supporting means located spaced from the extreme projecting point of said center means in the opposite axial direction for positioning in a predetermined position a workpiece engaging said center means whereby said center means is located in a control position moved from said extreme projecting position in the opposite axial direction; clamping stop means mounted on said supporting means and being movable into a clamping position engaging and clamped to said supporting means for blocking movement of said center means in said opposite axial direction; shifting means engaging said center means and said clamping stop means for shifting said center means relative to said supporting means and said abutment means in said one axial direction for a predetermined constant distance from said control position into an operating position in which the workpiece is spaced said predetermined constant distance from said abutment means; and common operating means for said clamping stop means and said shifting means for consecutively operating said clamping means and said shifting means.

9. In a centering arrangement for rotary machine tools, in combination, supporting means including a hollow spindle; center means adapted to engage a center hole in a workpiece and being mounted in said hollow spindle movable in axial direction; resilient means urging said center means in one axial direction into an extreme projecting position adapted to project toward a workpiece; abutment means secured to said supporting means for positioning in a predetermined position a workpiece engaging said center means whereby said center means is located in a control position moved from said extreme projecting position in the opposite axial direction; a clamping ring surrounding said center means and being located within said hollow spindle, said clamping ring having an axial slot of trapezoidal cross-section widening in outward direction, said clamping ring being movable into an expanded position engaging and clamped to said hollow spindle; at least one ball member in said axial slot; an operating sleeve mounted on said hollow spindle movable in axial direction into an actuating position, said operating sleeve having an inner shoulder portion engaging said ball member during movement to said actuating position and urging the same inwardly into said slot in said clamping ring for moving said clamping ring into said expanded position; a conical annular face on said center means; a conical annular face on said clamping ring located opposite said conical annular face of said center means to form with the same an annular groove having a trapezoid cross-section widening in outward direction; ball means located in said annular groove, said operating sleeve having another inner shoulder portion engaging said ball means during movement of said operating sleeve in said one axial direction to said actuating position and urging said ball means inwardly into said annular groove for shifting said center means in said one axial direction and for a predetermined constant distance away from said clamping ring into an operating position for shifting the workpiece to a position spaced from said abutment means.

10. An arrangement as claimed in claim 9 and including spring means urging said center means and said clamping ring toward each other.

11. An arrangement as claimed in claim 9 and including means for adjusting the tension of said resilient means.

12. An arrangement as claimed in claim 9 and including a resilient stop means fixedly secured to said supporting means, and being engaged by said center means in said extreme projecting position of the same, said resilient member requiring for compression a force greater than the force exerted in said one axial direction by said resilient means on said center means.

13. An arrangement as claimed in claim 12 wherein said resilient stop means is a cup-shaped spring permitting a movement of said center means in said one direction for a distance which is greater than the distance between said conical annular faces on said clamping ring and on said center means in said shifted operating position of said center means.

14. In a centering arrangement for rotary machine tools, in combination, a support; center means having an extreme projecting point adapted to engage a center hole in a work piece, said center means being mounted in said support for axial movement between an extreme projecting position and a retracted position; abutment means mounted on said support and adapted to engage in a predetermined control position thereof the work piece when said center means is in a control position located between said extreme projecting position and said retracted position during movement of said center means from said extreme projecting position to said retracted position; a manually operated stop member movable in axial direction and shiftable between an inoperative position and a blocking position for blocking movement of said center means out of said control position toward said retracted position; and shifting means for shifting one of said means in axial direction for a predetermined distance out of said control position thereof and away from the other of said means so that said work piece is spaced from said abutment means during operation of the machine tool.

15. In a centering arrangement for rotary machine tools, in combination, supporting means; center means having an extreme projecting point adapted to engage a center hole in a work piece and being mounted in said supporting means for axial movement between an extreme projecting position and a retracted position; stop means movable between an inoperative position and a blocking position attached to said supporting means for blocking movement of said center means in a control position located intermediate said extreme projecting position and said retracted position during movement of said center means from said extreme projecting position to said retracted position; operating means for moving said stop means from said inoperative position to said blocking position of the same; and electric sensing means including means for emitting a feeler beam adapted to be blocked by the work piece when said center means is in said control position whereby an impulse is created in said sensing means, said sensing means being connected to said operating means so as to actuate the same to shift said stop means to said blocking position when the work piece blocks said beam.

16. In a centering arrangement for rotary machine tools, in combination, supporting means; center means having an extreme projecting point adapted to engage a center hole in a work piece and being mounted in said supporting means for axial movement between an extreme projecting position and a retracted position; stop means movable between an inoperative position and a blocking position attached to said supporting means for blocking movement of said center means in a control position located intermediate said extreme projecting position and said retracted position during movement of said center means from said extreme projecting position to said retracted position; operating means including servo-motor means connected to said stop means for moving said stop means from said inoperative position to said blocking position of the same; and electric sensing means including means for emitting a feeler beam adapted to be blocked by the work piece when said center means is in said control position whereby an impulse is created in said sensing means, said sensing means being connected to said servo-motor means so as to actuate the same to shift said stop means to said blocking position when the work piece blocks said beam.

17. In a centering arrangement for rotary machine tools, in combination, supporting means; center means having an extreme projecting point adapted to engage a center hole in a work piece and being mounted in said supporting means for axial movement between an extreme projecting position and a retracted position; clamping stop means movable between an inoperative position and a blocking position clamped to said supporting means for blocking movement of said center means in a control position located intermediate said extreme projecting position and said retracted position during movement of said center means from said extreme projecting position to said retracted position; operating means for moving said stop means from said inoperative position to said blocking position of the same; and electric sensing means including means for emitting a feeler beam adapted to be blocked by the work piece when said center means is in said control position whereby an impulse is created in said sensing means, said sensing means being connected to said operating means so as to actuate the same to shift said stop means to said blocking position when the work piece blocks said beam.

References Cited in the file of this patent

UNITED STATES PATENTS

| | | |
|---|---|---|
| 1,318,223 | Muller | Oct. 7, 1919 |
| 1,829,619 | Svenson | Oct. 27, 1931 |

FOREIGN PATENTS

| | | |
|---|---|---|
| 90,744 | Switzerland | Sept. 16, 1921 |
| 491,921 | Germany | Feb. 17, 1930 |